July 1, 1969     R. B. HARTMAN     3,453,358
PROCESS FOR THE PREPARATION OF AN IMAGE
Filed May 27, 1966
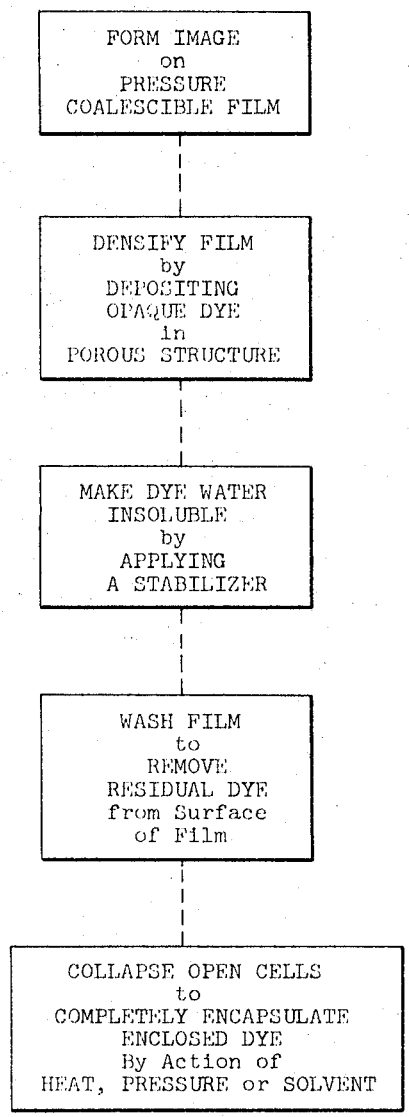
ROBERT B. HARTMAN
*INVENTOR.*

United States Patent Office 3,453,358
Patented July 1, 1969

3,453,358
PROCESS FOR THE PREPARATION OF AN IMAGE
Robert B. Hartman, Bridgeport, Conn., assignor to Remington Arms Company, Inc., Bridgeport, Conn., a corporation of Delaware
Filed May 27, 1966, Ser. No. 553,296
Int. Cl. B44d 5/06
U.S. Cl. 264—321        5 Claims

ABSTRACT OF THE DISCLOSURE

This application discloses a method of forming clearer images in opaque pressure coalescible films, which includes the steps of forming an image in the film by selectively collapsing the pores of the film in proportion to the desired degree of transparency in the selected areas of the film, followed by a post densification treatment in which a substantially opaque dye is deposited and rendered insoluble in those pores of the film which have not been collapsed but does not substantially penetrate into those pores which have been completely collapsed. After washing off any residual dye remaining on the surface of the film, the previously uncollapsed and now dye-impregnated pores of the film are completely collapsed, to complete the encapsulation of the dye, to render the image more lasting and to increase the contrast between light and dark sections thereof.

---

This application relates to a process of improving the permanence, contrast and optical projectability of reproductions made on opaque pressure coalescible film such as that shown in the U.S. patent to Bechtold, No. 2,957,791 patented Oct. 25, 1960, and other patents related thereto.

Such films comprise a clear plastic backing film to which there has been applied a porous coating which is opaque except in areas where the coating has been exposed to the action of pressure, heat, or solvents sufficient to collapse the minute pores of the coating of the film and render them optically transparent. Several specific examples are given in the patent cited above of the various methods which may be used to produce clarification of such composite films. Patents Nos. 3,118,178, 3,128,497, and 3,128,498 issued to F. P. Alles on Jan. 21, 1964, and Apr. 14, 1964, and Patents Nos. 3,243,843 and 3,244,777, both issued to B. R. Halpern on Apr. 5, 1966, show machines suitable for producing replicas in such film of relief printing forms such as type matter and half tone engravings. Patent No. 3,149,967 to Bechtold, issued Sept. 22, 1964, contains other examples of the clarification of such film and of its use in the production of photopolymer printing plates. My own copending application, Ser. No. 515,935, filed Dec. 23, 1965, discusses the use of such films to produce optically projectable replicas of coins, medals, engravings, ballistic specimens, machined surfaces, botanical specimens, etc.

In all of the uses of opaque pressure coalescible film it is important to produce replicas or reproductions having a wide density differential between the clear and opaque portions. It has been noted, particularly in the Bechtold and Halpern patents noted above, that the more porous optically opaque areas of such film which have not been subjected to pressure or other clarification treatment are capable of post densification by the in situ deposition of lead sulfide in the pores or by treatment with Prussian blue, chromates, and water soluble dies. However, since the unclarified areas of such film still retain their porous structure, they remain subject to mechanical damage which collapses the porous structure of the coating and results in density changes departing from faithful reproduction of the original material.

I have discovered that I can both render the image permanent and increase its contrast and optical projectability by a further post treatment of the clarified film which collapses the porous structure to encapsulate and fix the dyes or deposited pigments used in the Du Pont processes for post densification of the film. My new treatment is particularly effective when applied to pressure clarified films since those which have been clarified by heat or by solvent action tend to have the pore structure closed up and are less receptive to dyes or to the deposition in situ of pigments in the areas immediately adjacent a clarified area.

My new method requires the following steps.

(1) Clarification of the film to form the image by any one of the methods disclosed in the patents or in the patent application above referred to.

(2) Post densification of the image bearing film by deposition in the porous structure of opaque pigments or opaque dyes. This is generally a two-step process involving deposition of the active material in the pores followed by precipitation or insolubilization.

(3) Post-treatment of the densified image bearing film by the uniform application of pressure, heat, or solvents for the porous coating in such manner as to nearly completely, or completely, collapse the porous structure and encapsulate the pigment or dye without visually detectable lateral displacement of such pigment or dye.

DESCRIPTION OF THE DRAWING

The single figure of the drawing constitutes a flow diagram illustrating a preferred embodiment of the invention.

The following specific examples describe in more detail variations in the method.

Example I

In an example which is illustrative of the prior art, an image of a half dollar U.S. coin was produced on opaque pressure coalescible film in accordance with the method described in my patent application above referred to. The areas of the film which had not been in contact with the coin remained an opaque white while the areas on which the image was formed were of varying degrees of transparency depending on the modeling impressed in the coin. Viewed under strong transmitted light, or projected by a conventional slide projector, the image appeared amber or light golden brown with good detail apparent but without strong contrast between the lightest and the densest areas reproducing the surface of the coin. This film was dyed for 45 to 60 seconds with a black dye solution such as Du Pont's "Cronapress" densifier solution. This black dye was absorbed by the uncollapsed cells of the coating producing a very dense background. The dye was not substantially retained in the more completely clarified image areas because these cells had been at least partially collapsed and had largely lost their ability to absorb or retain the dye. Areas in which intermediate degrees of modeling had been impressed received proportionate amounts of dye. The excess of the dye solution was picked up by blotting gently with an absorbent blotter or tissue and the film was immediately treated for about 20 seconds by sponging or immersion in Du Pont's "Cronapress" stabilizer solution to insolubilize the dye, rinsed momentarily in water, swabbed to remove any residual dye from the surface, and dried. The opaque areas of the film were now a dense blue black and because the dye had been selectively absorbed in the clarified areas in proportion to the degree of clarification the contrast had been substantially increased. The densified film was viewed by transmitted light and optically projected with significantly better results than without densification and represented about the best results that can be obtained by the methods defined in the patents or in the patent application above referred to.

Example II

Following the methods described in Example I, an image of a half dollar U.S. coin was produced in opaque pressure coalescible film, densified by the application of dye and stabilized by insolubilization of the dye. The stabilized film was then treated by exposing it to heat by placing it in contact with a smooth plate heated to about 300° F. for 5 minutes or more. The film was held in contact with the heated plate by a wooden block to insure that all parts of the film were heated at least to the specified temperature. As a result of the heating, the porous structure of the film was collapsed and the opaque dye which had been absorbed in the cells in the porous structure was concentrated and fixed in place. In the transparent areas the film became more transparent and the contrast from light to dark areas was significantly increased. Careful microscopic examination confirmed that there had been no migration of the dye confined in the original porous structure and the reproduction of major and minor detail of the coins features was as faithful as before heat treatment. The increased contrast significantly improved the projectability of the film and is thought to be the result of more complete clarification of the collapsed areas which increases their transparency and of the fact that the coalescence of the dye impregnated porous structure tends to concentrate the dyes or fix in close superposition particles of dye which had been spaced apart in the superposed porosities of the coating.

Example III

Following the methods described in Example I, an image of a half dollar U.S. coin was produced in opaque pressure coalescible film, densified by the application of dye, and stabilized by the unsolubilization of the dye. The stabilized film was then treated by spraying it with a clear spray lacquer containing a vehicle which is a solvent for the coating on the pressure coalescible film and which destroys the porous nature of that coating. As a side effect the hardening of the resins upon which the lacquer is based produced a harder more damage-resistant surface. An example of an effective treating agent for this purpose is "Krylon" Crystal Clear Spray coating produced by Krylon Inc., of Norristown, Pennsylvania. The resinous base of this lacquer is understood to be an acrylic ester resin in a vehicle of aromatic, aliphatic, and halogenated hydrocarbons. Effective results are, however, obtained with other volatile hydrocarbon liquids which are solvents for the porous coating and which, after evaporating, leave the consolidated formerly porous coating material in place.

As in the case of the heat consolidated coating, this post treatment significantly increases the contrast, projectability, and durability of the treated film.

Example IV

Following the methods described in Example I, an image of a half dollar U.S. coin was produced in opaque pressure coalescible film, densified by the application of dye and stabilized by the insolubilization of the dye. The stabilized film was then treated by supporting it between a polished metal surface and a rubber faced platent in a pressure applying device such as a Tinius Olsen compression tester and pressure on the order of 10,000 p.s.i. applied over the contacted area which level of pressure is sufficient to completely collapse or coalesce any areas of the film not collapsed in the formation of the image.

As in the case of Examples II and III, this post treatment significantly increases the contrast and projectability of the treated film. Any other pressure post treatment such as that described in any of the patents noted above has a similar effect. For example, the bouncing ball technique of the Halpern patents may be used with a densified and stabilized film supported on a polished metal surface. This post treatment will improve contrast and projectability by collapsing the porous structure. As a practical matter the direct application of pressure to the image bearing surface requires such high loads that it can be used only on relatively small work pieces. For most purposes it is preferable to use repeated impressions making point or line contact to effect pressure collapsing of the porous structure.

Example V

In this example, an image of a copper plate bearing a half tone engraving was produced on opaque pressure coalescible film by compressing the film, with the coalescible coating in contact with the engraving, between the engraving and a rubber faced pressure plate. The compression was produced by applying pressure at a rate of about 10,000 p.s.i. in a Tinius Olsen compression testing machine. The film was then densified with a black dye and stabilized to insolubilize the dye as in Example I. There was good reproduction of the black dots of varying size which make up the usual halftone reproduction but the intervening light spaces were less than clear giving a faintly foggy effect to the image and substantially reducing contrast. When this densified film was subjected to uniform heating by application for about 5 minutes to a metal plate heated to about 300° F. the foggy effect on the highlight and background areas disappeared and there was evident a great improvement in the contrast and printability of the reproduction. In this example also the film was held in contact with the hot plate by a wooden block to insure that all parts of the film were heated to at least the specified temperature. Careful examination with a binocular microscope revealed no evidence of distortion or displacement of the dye which had been encapsulated in the porous structure and it seems apparent that the collapsing of the porous structure by heat had simply completed the encapsulation and fixation of the densifying dye. Tests of the ability of the heat treated film to resist scratching and other mechanical damage revealed a substantial improvement.

Example VI

In this example, an image of the same copper plate was formed in accordance with the procedure set forth in Example V and, as in that example, the image was densified with a black dye and stabilized by insolubilizing the dye within the porous structure. The densified and stabilized film was then treated as in Example III by spraying it with a clear spray lacquer containing a volatile vehicle which is a solvent for the coating on the coalescible coating and which by solvent action coalesces the coating and destroys its porous character. Here also the net effect was to further clarify the light areas and to fix and encapsulate the dyes which had been contained in the porous structure. The contrast printability and durability of the film so treated was significantly improved.

Example VII

In this example a sample of the film was used to reproduce a halftone engraving in the "ball jogging" apparatus of the Halpern Patent No. 3,243,843 by the process defined in the Halpern Patent No. 3,244,777 and subsequently densified and stabilized as in the preceding examples and in the Halpern patents. This densified and stabilized film was post-treated by spraying with a clear lacquer as in Examples III and VI.

In this case also the contrast, printability, and abrasion resistance of the treated film was significantly improved.

As noted in Example IV the "ball jogging" apparatus of the Halpern patents might have been used for post treatment of the densified and stabilized film by mounting the film on a smooth surface and subjecting it to the action of the "ball jogging" apparatus for a time sufficient to produce complete clarification of a film in which the densifying dye had not been encapsulated.

As noted in Examples II and V above, the film may be post-treated by the heat transmitted from a hot plate. This post-treatment, however, is not effective unless certain fairly critical amounts of heat transfer are effected. At temperatures in the range of from about 150° F. to about 250° F. those portions of the film which have not absorbed dye are collapsed and made more transparent but except for an increase in the abrasion resistance of the surface there is no apparent change in those portions of the film which have been densified by the absorption of dye. A hot plate temperature of about 300° F. appears to be about the practical minimum temperature hot plate which can be effectively used and this temperature is not effective unless the film is held in engagement with the plate by a wooden or other non-conducting block for a period of about 5 minutes. As the temperature is increased the time required for post-treatment by heat decreases up to a point where the basic film supporting the coating becomes distorted or actually melts. Unless the film is held in contact with the hot plate during the post-treatment there is some tendency for localized curling of the film which destroys the uniformity of the heat transfer and the expected increase in clarity and contrast of the coated surface of the film will not be uniform.

Although I have shown above a number of specific examples of the practice of my improved process, I do not consider that my invention is limited by these specific examples. Regardless of the methods by which the image of a relief surface has been formed in an opaque pressure coalescible film it appears to be clear that any post-treatment of an image bearing film which has been densified and stabilized may be used to improve the contrast, projectability, printability and durability of image of that film provided that the post-treatment is one which has the effect of pressure, heat, or solvents in collapsing the porous structure of the coalescible coating of the film and concentrating it in a continuous transparent layer in which the densifying dye has been permanently encapsulated.

I claim:

1. In a method of forming clear images in opaque pressure coalescible films which includes the steps of forming an image in such film, and stabilizing the image by fixing a densifying agent in the pores of the film, the improvement in that method which comprises subjecting the densified and stabilized film to a post-treatment which substantially completely collapses and destroys the porous nature of the coalescible coating on the film to permanently encapsulate the densifying agent and to render more transparent those areas of the film in which less than a maximum amount of densifying agent has been deposited.

2. A method as defined in claim 1 in which the post-treatment consists in the application to the film of a sufficient amount of heat to fuse the coalescible structure of the coating on the film and to substantially completely collapse the porosities therein.

3. A method as defined in claim 1 in which the post-treatment consists in the application to the film of a sufficient amount of mechanical pressure to collapse the coalescible structure of the coating of the film and to substantially completely close the porosities therein.

4. A method as defined in claim 1 in which the post-treatment consists in the application to the film of a sufficient amount of volatile solvent for the coalescible structure of the coating of the film to collapse the coalescible structure and to substantially completely close the porosities therein.

5. A method as defined in claim 4 in which the volatile solvent is a lacquer having dissolved therein a drying resin which hardens and seals the collapsed coalescible structure.

References Cited

UNITED STATES PATENTS 3,118,178  1/1964  Alles.
3,149,967  9/1964  Bechtold _____ 96—36.3
3,298,895  1/1967  Plambeck _____ 264—321 XR PHILIP E. ANDERSON, *Primary Examiner.*

U.S. Cl. X.R.

96—36.3; 161—165; 260—2.5; 264—1, 331